United States Patent [19]

Tomoo et al.

[11] Patent Number: 5,193,952

[45] Date of Patent: Mar. 16, 1993

[54] INNER CIRCLE CUTTING CONTROL APPARATUS FOR NUMERICALLY CONTROLLED MACHINE TOOL

[75] Inventors: Hayashi Tomoo; Momochi Takeshi; Kato Kenji; Matsumoto Michio, all of Numazu, Japan

[73] Assignee: Toshiba Kikai Kabushiki Kaisha, Tokyo, Japan

[21] Appl. No.: 838,686

[22] Filed: Feb. 21, 1992

[30] Foreign Application Priority Data

Feb. 21, 1991 [JP] Japan .................................. 3-027584

[51] Int. Cl.⁵ .......................... B23C 9/00; G05B 19/18
[52] U.S. Cl. ..................................... 409/80; 318/574; 364/474.32; 364/474.33
[58] Field of Search ................ 409/80, 84, 132; 318/574, 572, 569; 364/474.32, 474.33, 474.35, 474.01, 474.15, 474.29, 474.26, 474.31

[56] References Cited

U.S. PATENT DOCUMENTS

| | | | |
|---|---|---|---|
| 3,878,983 | 4/1975 | Hamill, III et al. | 318/574 |
| 4,031,369 | 6/1977 | Heaman | 364/474.31 |
| 4,034,192 | 7/1977 | Kishi et al. | 364/474.31 |
| 4,070,608 | 1/1978 | Rosshirt et al. | 318/572 |
| 4,150,328 | 4/1979 | Cannon | 364/474.31 X |
| 4,199,814 | 4/1980 | Rapp | 364/474.26 X |
| 4,514,814 | 4/1985 | Evans | 364/474.11 |
| 4,703,415 | 10/1987 | Kishi et al. | 364/474.32 |
| 4,949,270 | 8/1990 | Shima et al. | 364/474.26 |

FOREIGN PATENT DOCUMENTS 102302  5/1987  Japan .................................. 409/80

*Primary Examiner*—William Briggs
*Attorney, Agent, or Firm*—Banner, Birch, McKie & Beckett

[57] ABSTRACT

An apparatus for cutting an inner circle in a workpiece with a cutter of a numerically controlled machine tool linearly moves the cutter from the center of an inner circle in the workpiece in a radial distance according to an initially cut radius I, and cuts an inner circle in the workpiece according to a radial depth of cut K until a finally cut radius J is reached. As other command parameters, there are supplied an initial workpiece radius P which indicates the minimum distance from the center of the inner circle in the workpiece to the workpiece, and a cutting feed starting distance SN that the cutter starts to move at a cutting feed rate across the initial workpiece radius P before reaching the workpiece. The length of a linear path that the cutter linearly moves is compared with the initial workpiece radius P, a feed rate at which the cutter is to move along the linear path is determined depending on the result of comparison between the length of the linear path and the initial workpiece radius P.

7 Claims, 6 Drawing Sheets

INNER CIRCLE CUTTING CONTROL APPARATUS FOR NUMERICALLY CONTROLLED MACHINE TOOL

BACKGROUND OF THE INVENTION

1. Field of the Invention

The present invention relates to an inner circle cutting control apparatus for a numerically controlled machine tool which is supplied with commands relative to parameters including an initially cut radius I, a finally cut radius J, a radial depth of cut K, and a cutter diameter D, for linearly moving a cutter from the center of an inner circle in a workpiece by a predetermined distance according to the initially cut radius I, and then controlling the cutter to cut an inner circle in the workpiece according to the radial depth of cut K until the finally cut radius J is reached.

2. Description of the Prior Art

Numerically controlled machine tools are used in a wide variety of fields of art. Many applications require inner circles to be cut in workpieces by numerically controlled machine tools. For cutting an inner circle in a workpiece with a numerically controlled machine tool, it has been customary to give command parameters relative to the inner circle to be cut desired numerical values for the inner circle, and to control a cutter to machine the workpiece based on the parameter commands under numerical control.

FIG. 7 of the accompanying drawings shows a conventional inner circle cutting apparatus for numerically controlled machine tools. A desired inner circle is to be cut in a workpiece 4 by a cutter 2. The inner circle cutting apparatus is supplied with command parameters including an initially cut radius I, a finally cut radius J, a radial depth of cut K, a cutter diameter D, a cutting speed F, a final vertical position Z in an Z-axis direction, and a vertical depth of cut Q.

First, the cutter 2 linearly moves from the center of an inner circle in the workpiece 4 as indicated by the arrow ①, in a mode known as linear approach, and then cuts the workpiece 4 arcuately as indicated by the arrow ② until the initial radius I is reached. Thereafter, the cutter 2 cuts the workpiece 4 along a full circumference according to the initial radius as indicated by the arrow ③, and then moves arcuately as indicated by the arrow ④, after which the cutter 2 linearly moves back to the center as indicated by the arrow ⑤.

The cutter 2 makes the above movement in one cutting cycle. In a next cutting cycle, the initially cut radius I is increased a certain interval based on the radius depth of cut K, and the above cutting cycle is repeated. The workpiece 4 is cut by the cutter 2 in successive cutting cycles until the radius of the cut circle reaches the finally cut radius J. The cutter 2 starts cutting the workpiece 4 in a vertical or Z-axis direction at a point Z0.

The linear movement of the cutter 2 from the center of the inner circle as indicated by the arrow ①, i.e., the linear approach mode, will be described in detail below with reference to FIG. 8 of the accompanying drawings. In the linear approach mode, when the initial radius I is given, the cutter 2 is linearly moved at 45° by a distance of $I\cos 45°$. At this time, the cutter 2 may be moved at a quick feed rate or a cutting feed rate. Designated at D is the diameter of the cutter 2.

When the cutter 2 cuts the workpiece 4 arcuately as indicated by the arrow ②, the cutter 2 moves arcuately through 90° at a radius of $\frac{1}{2}I$ after it has been linearly moved in the linear approach mode.

If the cutter 2 moves at a quick feed rate in the linear approach mode, then the time required to effect the entire cutting process is shorter than if it moves at a cutting rate. However, in the event that the cutter 2 physically interferes with the workpiece 4 in the linear approach mode while the cutter 2 is moving at a quick feed rate, the cutter 2 or the machine tool supporting the cutter 2 is subjected to large stresses and the service life thereof is shortened.

FIGS. 9 and 10 of the accompanying drawings show the manner in which the path of the cutter 2 physically interferes with the workpiece 4. In FIG. 9, the path of the cutter 2 when it linearly moves in the linear approach mode physically interferes with the workpiece 4 at a point A. In FIG. 10, the radius of the inner circle is increased by the radial depth of cut K, and the workpiece 4 is to be cut by the cutter 2 according to the increased radius. The workpiece 4 has been cut to the previous inner circle. In this case, the path of the cutter 2 in the linear approach mode physically interferes with the workpiece 4 at a point B.

In cases where the workpiece 2 is expected to physically interfere with the workpiece 4 in the conventional inner circle cutting practice, the cutter 2 is moved at a cutting feed rate in the linear approach mode. Therefore, the cutting process time is relatively long.

SUMMARY OF THE INVENTION

It is an object of the present invention to provide an inner circle cutting control apparatus for numerically controlled machine tools which is supplied with, among other command parameters, a command parameter representative of the possibility of a physical interference between a cutter and a workpiece, for switching from a quick feed rate to a cutting feed rate for moving the cutter immediately before the tool is about to physically interfere with the workpiece when the cutter moves in a linear approach mode, thereby preventing the service life of the cutter and the machine tool from being shortened and also shortening the time required to effect the cutting process.

According to the present invention, there is provided an apparatus for cutting an inner circle in a workpiece with a cutter of a numerically controlled machine tool, comprising means for supplying, as command parameters, an initially cut radius I, a finally cut radius J, a radial depth of cut K, and a cutter diameter D, means for linearly moving the cutter from the center of an inner circle in the workpiece in a radial distance according to the initially cut radius I, means for cutting an inner circle in the workpiece according to the radial depth of cut K until the finally cut radius J is reached, means for supplying, as command parameters, an initial workpiece radius P which indicates the minimum distance from the center of the inner circle in the workpiece to the workpiece, and a cutting feed starting distance SN that the cutter starts to move at a cutting feed rate across the initial workpiece radius P before reaching the workpiece, means for comparing the length of a linear path that the cutter linearly moves with the initial workpiece radius P, and means for determining a feed rate at which the cutter is to move along the linear path, depending on the result of comparison between the length of the linear path and the initial workpiece radius P.

The cutter is moved at a quick feed rate along the linear path when the initial workpiece radius P is larger than a value determined by the initially cut radius I and the cutter diameter D.

The value is equal to the sum of the initially cut radius I and half of the cutter diameter D.

The cutter is moved at a quick feed rate along the linear path up to a position determined by the initial workpiece radius P, the cutting feed starting distance SN, and the cutter diameter D, when the initial workpiece radius P is larger than a value determined by the cutting feed starting distance SN and the cutter diameter D and smaller than a value determined by the initially cut radius I and the cutter diameter D, and thereafter at a cutting feed rate.

The value determined by the cutting feed starting distance SN and the cutter diameter D is equal to the sum of the cutting feed starting distance SN and half of the cutter diameter D, the value determined by the initially cut radius I and the cutter diameter D is equal to the sum of the initially cut radius I and half of the cutter diameter D, and the position determined by the initial workpiece radius P, the cutting feed starting distance SN, and the cutter diameter D is the difference between the initial workpiece radius P and the sum of the cutting feed starting distance SN and half of the cutter diameter D.

The cutter is moved at a cutting feed rate along the linear path when the initial workpiece radius P is larger than a value determined by the cutting feed starting distance SN and the cutter diameter D.

The value determined by the cutting feed starting distance SN and the cutter diameter D is equal to the sum of the cutting feed starting distance SN and half of the cutter diameter D.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
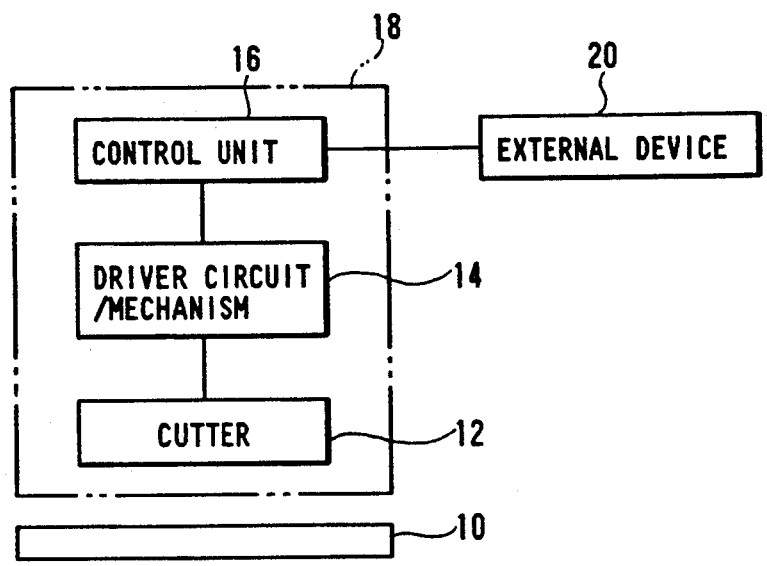
FIG. 1 is a block diagram of a numerically controlled machine tool which incorporates an inner circle cutting control apparatus according to the present invention.

FIG. 1 shows in block form a numerically controlled machine tool which incorporates an inner circle cutting control apparatus according to the present invention. The numerically controlled machine tool, denoted at 18, comprises a cutter 12 such as a drill bit for cutting a workpiece 10, a driver circuit/mechanism 14 for actuating the cutter 12, and a control unit 16 such as a microprocessor or the like for controlling the driver circuit/mechanism 14.

The control unit 16 is supplied with machining commands from an external device 20 through an input interface, and stores the supplied machining commands in an internal memory. The control unit 16 successively reads the stored machining commands, and operates the driver circuit/mechanism 14 according to the machining commands to cause the cutter 12 to machine the workpiece 10 to a desired shape.

For an inner circle cutting control process, the machining commands supplied to the control unit 16 comprise command parameters including an initially cut radius I, a finally cut radius J, a radial depth of cut K, a cutter diameter D, an initial workpiece radius P which indicates the minimum distance from the center of an inner circle in the workpiece 10 to the workpiece 10, and a cutting feed starting distance SN that the cutter 12 starts to move at a cutting feed rate before reaching the workpiece 10. The control unit 16 includes a processing unit serving as a comparing means for comparing the length of a linear path that the cutter 12 linearly moves in a linear approach mode with the initial workpiece radius P.

Figure 2:
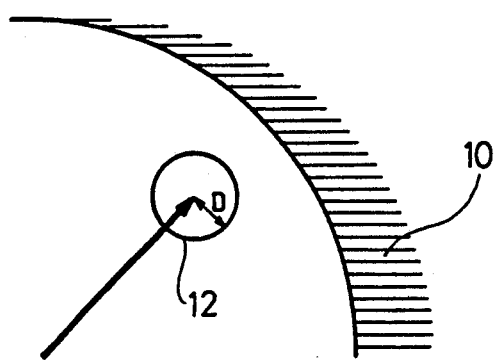
FIGS. 2, 3, and 4 are schematic views showing different distances which a cutter is required to linearly move in a linear approach mode with respect to a workpiece.

More specifically, the cutter 12 is moved linearly a predetermined distance from the center of the inner circle in the workpiece 10 and then moved arcuately. The cutter 12 is then controlled to cut the workpiece 10 along a circumferential surface therein according to the initially cut radius I. Based on the radial depth of cut K, the cutter 12 cuts successively inner circles in the workpiece 10 until finally cut radius J is reached. In the linear approach mode, the length of the linear path that the cutter 12 linearly moves and the initial workpiece radius P from the center of the inner circle to the workpiece 10 is compared with each other, and the rate at which the cutter 12 is to move in the linear approach mode is determined as follows:

In the linear approach mode, the cutter 12 may move with respect to the workpiece 10 in one of three different fashions. According to a first possibility, the distance that the cutter 12 moves linearly terminates short of the workpiece 10 as shown in FIG. 2. In a second alternative, the cutter 12 physically interferes with the workpiece 10. According to a third case, the workpiece 10 is positioned within a distance which is equal to the sum of the radius of the cutter 12 and the cutting feed starting distance SN. In the first case, the cutter 12 can be linearly moved at a quick feed rate all the way. In the second alternative, the cutter 12 can be linearly moved at a quick feed rate to a position immediately in front of the workpiece 10, and thereafter moved at a cutting feed rate until the final position of the stroke of linear movement is reached. In the third case, the cutter 12 can be linearly moved at a cutting feed rate.

If the initial workpiece radius P is greater than a predetermined value (equal to the distance of linear movement in the linear approach mode) determined by the initially cut radius I and the cutter diameter D, then the cutter 12 is linearly moved at a quick feed rate. If the initial workpiece radius P is greater than a predetermined value determined by the cutting feed starting distance SN and the cutter diameter D but smaller than the initially cut radius I and the cutter diameter D, then the cutter 12 is linearly moved at a quick feed rate up to a position determined depending on the initial workpiece radius P, the cutting feed starting distance SN, and the cutter diameter D, and thereafter at a cutting feed rate. If the initial workpiece radius P is smaller than a predetermined value determined by the cutting feed starting distance SN and the cutter diameter D, then the cutter 12 is linearly moved at a cutting feed rate.

Operation of the inner circle cutting control apparatus will be described in greater detail below.

Figure 3:
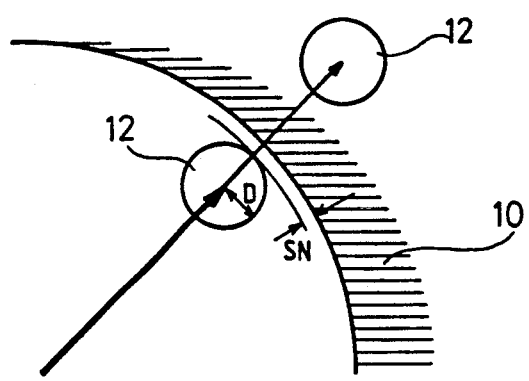
Figure 4:
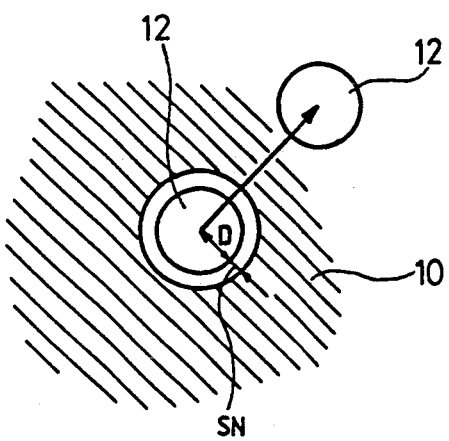

FIGS. 2, 3, and 4 schematically show different distances which the cutter 12 is required to linearly move in the linear approach mode with respect to the workpiece 10. FIG. 2 shows the first case in which the linear distance that the cutter 12 moves terminates short of the workpiece 10. FIG. 3 illustrates the second case in which the cutter 12 physically interferes with the workpiece 10. FIG. 4 shows the third alternative in which the workpiece 10 is positioned within the distance which is the sum of the radius of the cutter 12 and the cutting feed starting distance SN.

In FIG. 2, the following inequality is satisfied:

$$MR < FR/\sqrt{2} + |D/2| \qquad (1)$$

where FR is the cut radius, and MR is the workpiece radius. In this case, the distance traversed by the cutter 12 in the linear approach mode terminates short of the workpiece 10.

In FIG. 3, the following inequality is satisfied:

$$SN + |D/2| < MR \leq FR\sqrt{2} + |D/2|. \qquad (2)$$

In this case, the cutter 12 physically interferes with the workpiece 10. In the linear approach mode, the cutter 12 is linearly moved at a quick feed rate up to a position immediately in front of the workpiece 10, the position having coordinates:

$$x = x0 + (MR - SN - |D/2|)/\sqrt{2} \qquad (3)$$

$$y = y0 + (MR - SN - |D/2|)/\sqrt{2}$$

where x, y is the x and y coordinates of the position to be reached from the center of the inner circle in the linear approach mode, with x0, y0 being the coordinates of the center of the inner circle. Then, the cutter 12 is linearly moved at a cutting feed rate up to a final position of the stroke of the linear approach mode.

In FIG. 4, the following condition is satisfied:

$$0 \leq MR \leq SN + |D/2| \qquad (4)$$

In this case, the workpiece 10 is positioned within the distance which is the sum of the radius of the cutter 12 and the cutting feed starting distance SN, and the cutter 12 is moved at a cutting feed rate all the way.

The above relationship is summarized in the following table 1:

TABLE 1

| Radius | MR | FR |
|---|---|---|
| 1st | P | $I - |D/2|$ |
| nth | $I + (n - 2) \times K$ | $I + (n - 1) \times K - |D/2|$ |
| Final | $I + (n - 2) \times K$ | $J - |D/2|$ |

In the above table 1, FR is the cut radius, and MR is the workpiece radius, as described above. These radii MR, FR vary each time the radial depth of cut K is added to the cut radius in the inner circle cutting process, and the radius of the inner circle increases as the workpiece 10 is successively machined. n indicates the number of times the radius of the circle that is cut varies, and n=1 in the initial cutting cycle.

A process of cutting an inner circle in the workpiece 10 will be described below with reference to FIG. 5.

Figure 7:
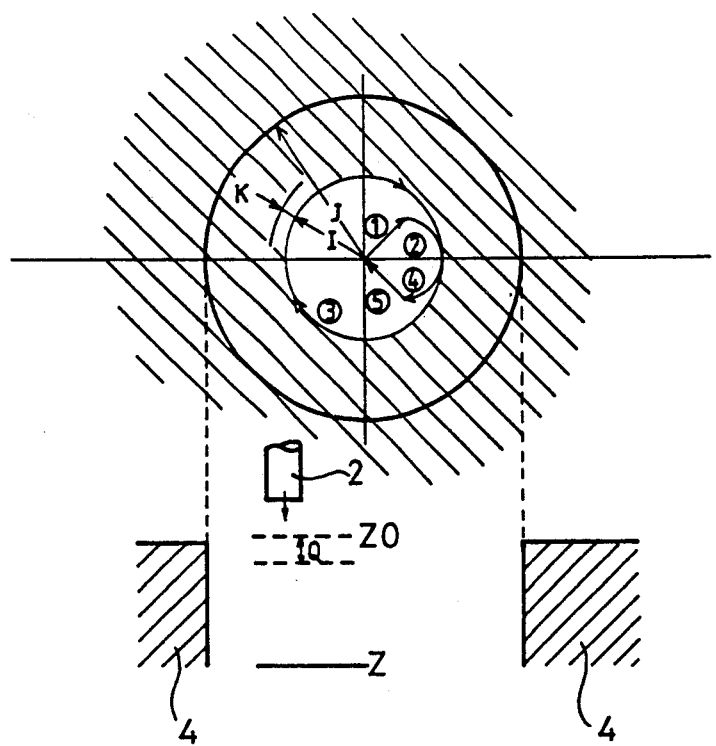
FIG. 7 is a diagram illustrative of an inner circle cutting control process carried out by a conventional inner circle cutting control apparatus.
Figure 8:
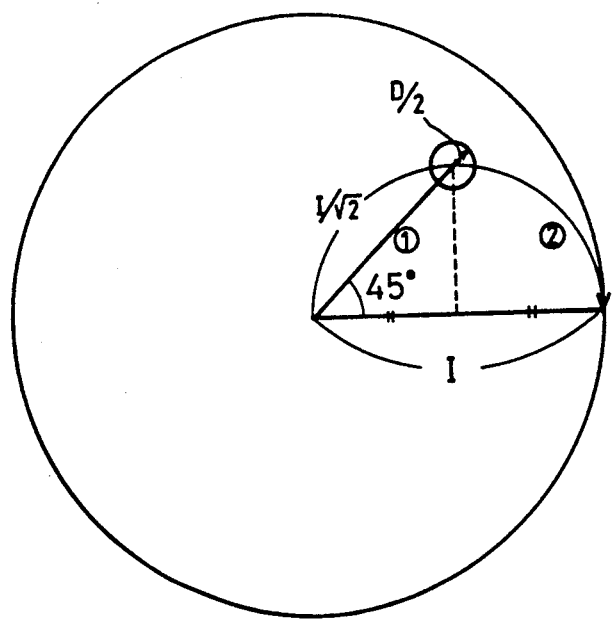
FIG. 8 is a diagram illustrative of a linear approach mode of the inner circle cutting control process shown in FIG. 7.
Figure 9:
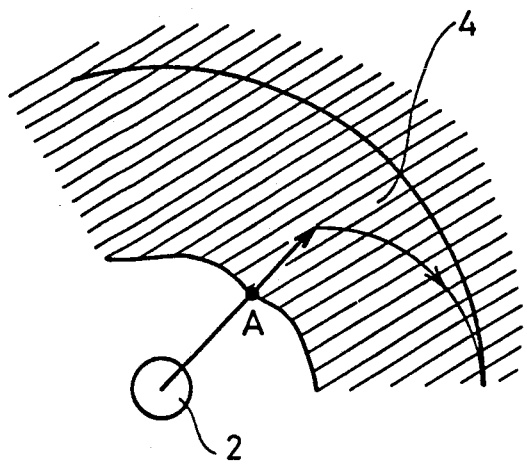
FIGS. 9 and 10 are schematic views showing the manner in which a cutter physically interferes with a workpiece.
Figure 10:
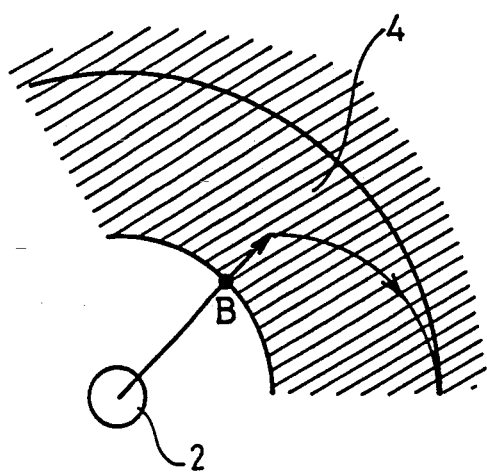

First, the cutter 12 is moved at a quick feed rate to a vertical cutting starting position Z0 in a step S1, and then the cutter 12 cuts in the workpiece 10 by a vertical depth of cut Q at a cutting feed rate in a step S2 (see FIG. 7). Then, a step S3 checks the cutter 12 for a physical interference with the workpiece.

The checking step S3 is carried out by determining which of the cases shown in FIGS. 2, 3, and 4 or the inequalities (1), (2), and (4) the linear movement of the cutter 12 in the linear approach mode applies to. If the cutter 12 is going to physically interfere with the workpiece 10, then the cutter 12 switches from the quick feed rate to the cutting feed rate immediately before the cutter 12 physically interferes with the workpiece 10.

If the inequality (1) (FIG. 2) is applicable in the step S4, then the cutter 12 is linearly moved at the quick feed rate in a step S6. If the inequality (2) (FIG. 3) is applicable in a step S5, then the cutter 12 is linearly moved at the quick feed rate up to a position indicated by the inequality (3) immediately before the cuter 12 physically interferes with the workpiece 10, and is thereafter linearly moved at the cutting feed rate up to the final position of the stroke of the linear approach mode in a step S7.

If the inequalities (1), (2) are not applicable, but the inequality (4) is applicable in the steps S4, S5, then the cutter 12 is linearly moved at the cutting feed rate in a step S8.

Figure 6:
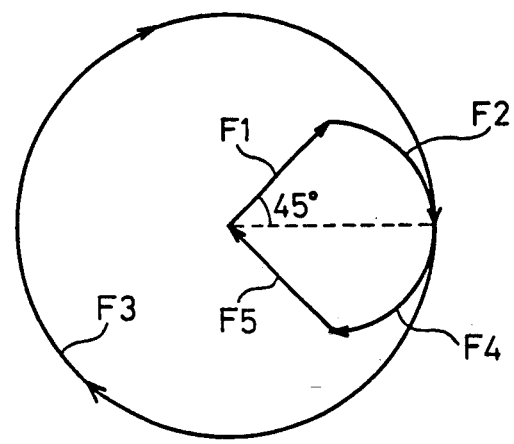
FIG. 6 is a diagram illustrative of an inner circle cutting control process carried out by the inner circle cutting control apparatus according to the present invention.

Thereafter, as shown in FIG. 6, the cutter 12 is arcuately moved as indicated by the arrow F2 in a step S9, circumferentially moved to cut the workpiece 10 as indicated by the arrow F3 in a step S10, arcuately moved off the workpiece 10 as indicated by the arrow F4 in a step S11, and linearly moved back to the circle center as indicated by the arrow F5 in a step S12, thus cutting an inner circle in the workpiece 10 in one cutting cycle.

If the cutter 12 has not reached a final vertical cutting position yet in a step S13, then control goes back to the step S2 and repeats the above steps. If the cutter 12 has reached a final vertical cutting position, then a step S14 determines whether the finally cut radius J has been reached or not.

If the finally cut radius J has not been reached yet in the step S14, then the workpiece radius is replaced with the presently cut radius in a step S16, and the cut radius is increased by the radial depth of cut K in a step S17. Thereafter, control returns to the step S1 to repeat the above steps. If the finally cut radius J has been reached in the step S14, since the desired inner circle has been cut, the cutter 12 is returned at a quick feed rate to the vertical cutting start point Z0 in a step S15. The inner circle cutting process is now completely finished.

Figure 5:
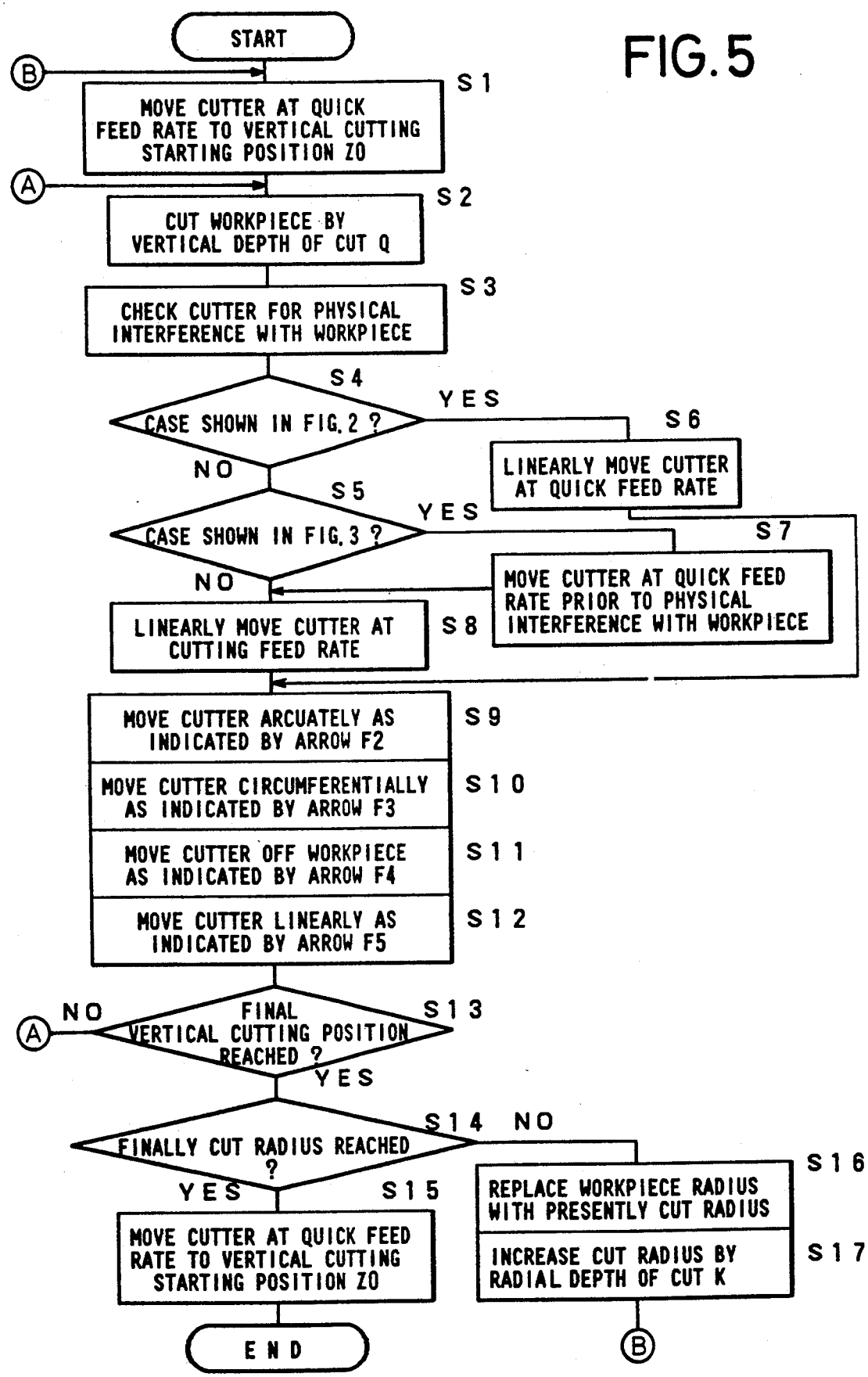
FIG. 5 is a flowchart of an operation sequence of the inner circle cutting control apparatus according to the present invention.

In the flowchart shown in FIG. 5, the cutting in the vertical Z-axis direction has priority over the cutting in the radial direction. However, the workpiece may be repeatedly machined such that the cut radius is incremented by the radial depth of cut K until the workpiece is cut to the finally cut radius J, and then the workpiece is cut to the vertical depth of cut Q, after which the cut radius is incremented again by the radial depth of cut K until the finally cut radius J is reached. Furthermore, the cutter 12 may be moved in the workpiece in the reversed sequence in the successive directions indicated by the arrows F5, F4, F3, F2, F1 shown in FIG. 6.

The inner circle cutting control apparatus according to the present invention offers the following advantages:

The inner circle cutting control apparatus is supplied with command parameters including an initially cut radius I, a finally cut radius J, a radial depth of cut K, a cutter diameter D, an initial workpiece radius P which indicates the minimum distance from the center of an inner circle in the workpiece 10 to the workpiece 10, and a cutting feed starting distance SN that the cutter 12 starts to move at a cutting feed rate before reaching the workpiece 10. The initial workpiece radius P and the cutting feed starting distance SN serve as parameters indicative of the possibility of a physical interference between the cutter 12 and the workpiece 10. The control unit 16 of the inner circle cutting control apparatus includes a processing unit as a comparing means for comparing the length of a linear path that the cutter 12 linearly moves in the linear approach mode with the initial workpiece radius P.

After the cutter 12 has been linearly moved from the center of an inner circle in the workpiece by a distance according to the initially cut radius I, the cutter 12 is controlled to cut an inner circle in the workpiece according to the radius depth of cut K. The cutter 12 cuts successive inner circles with different cut radii based on the radial depth of cut K until the finally cut radius J is reached. In the inner circle cutting process, the length of the linear path that the cutter 12 linearly moves in the linear approach mode is compared with the initial workpiece radius P, and if the cutter 12 is about to physically interfere with the workpiece 10, then the feed rate of the cutter 12 is controlled to switch from the quick feed rate to the cutting feed rate immediately before the cutter 12 physically interferes with the workpiece 10.

Consequently, the period of time required for the cutter 12 to linearly move in the linear approach mode in cases where the cutter 12 is expected to physically interfere with the workpiece 10, can be shortened. In the position in which the cutter 12 physically interferes with the workpiece 10, the cutter 12 is moved at the cutting feed rate. Therefore, the cutter 12 and the machine tool associated therewith are subjected to reduced stress, and can have a long service life.

Although a certain preferred embodiment of the present invention has been shown and described in detail, it should be understood that various changes and modifications may be made therein without departing from the scope of the appended claims.

What is claimed is:

1. An apparatus for cutting an inner circle in a workpiece with a cutter of a numerically controlled machine tool, comprising:
   means for supplying, as command parameters, an initially cut radius I, a finally cut radius J, a radial depth of cut K, and a cutter diameter D;
   means for linearly moving the cutter from the center of an inner circle in the workpiece in a radial distance according to the initially cut radius I;
   means for cutting an inner circle in the workpiece according to the radial depth of cut K until the finally cut radius J is reached;
   means for supplying, as command parameters, an initial workpiece radius P which indicates the minimum distance from the center of the inner circle in the workpiece to the workpiece, and a cutting feed starting distance SN that the cutter starts to move at a cutting feed rate across the initial workpiece radius P before reaching the workpiece;
   means for comparing the length of a linear path that the cutter linearly moves with the initial workpiece radius P; and
   means for determining a feed rate at which the cutter is to move along said linear path, depending on the result of comparison between the length of the linear path and the initial workpiece radius P.

2. An apparatus according to claim 1, wherein said means for determining comprises means for moving the cutter at a quick feed rate along the linear path when the initial workpiece radius P is larger than a value determined by the initially cut radius I and the cutter diameter D.

3. An apparatus according to claim 2, wherein said value is equal to the sum of the initially cut radius I and half of the cutter diameter D.

4. An apparatus according to claim 1, wherein said means for determining comprises means for moving the cutter at a quick feed rate along the linear path up to a position determined by the initial workpiece radius P, the cutting feed starting distance SN, and the cutter diameter D, when the initial workpiece radius P is larger than a value determined by the cutting feed starting distance SN and the cutter diameter D and smaller than a value determined by the initially cut radius I and the cutter diameter D, and thereafter at a cutting feed rate.

5. An apparatus according to claim 4, wherein said value determined by the cutting feed starting distance SN and the cutter diameter D is equal to the sum of the cutting feed starting distance SN and half of the cutte diameter D, said value determined by the initially cut radius I and the cutter diameter D is equal to the sum of the initially cut radius I and half of the cutter diameter D, and said position determined by the initial workpiece radius P, the cutting feed starting distance SN, and the cutter diameter D is the difference between the initial workpiece radius P and the sum of the cutting feed starting distance SN and half of the cutter diameter D.

6. An apparatus according to claim 1, wherein said means for determining comprises means for moving the cutter at a cutting feed rate along the linear path when the initial workpiece radius P is larger than a value determined by the cutting feed starting distance SN and the cutter diameter D.

7. An apparatus according to claim 6, wherein said value determined by the cutting feed starting distance SN and the cutter diameter D is equal to the sum of the cutting feed starting distance SN and half of the cutter diameter D.

* * * * *